(12) United States Patent
Jin

(10) Patent No.: US 6,414,924 B1
(45) Date of Patent: Jul. 2, 2002

(54) METHOD AND APPARATUS CAPABLE OF IDENTIFYING DIFFERENT TYPES OF DISK-SHAPED INFORMATION STORAGE MEDIA

(75) Inventor: Cheol Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/311,285

(22) Filed: May 14, 1999

(30) Foreign Application Priority Data

May 15, 1998 (KR) ............................................. 98-17705

(51) Int. Cl.[7] ................................................ G11B 7/00
(52) U.S. Cl. ...................... 369/53.2; 369/53.3
(58) Field of Search ................. 369/53.2, 53.3

(56) References Cited

U.S. PATENT DOCUMENTS 5,644,561 A * 7/1997 Son et al. ...................... 369/58
5,870,363 A * 2/1999 Sun et al. ...................... 369/50
5,877,623 A * 3/1999 Min
5,982,725 A * 11/1999 Kubo et al. ................... 369/50

* cited by examiner

Primary Examiner—W. R. Young
(74) Attorney, Agent, or Firm—Birch, Stewart, Kolasch & Birch, LLP.

(57) ABSTRACT

This invention provides a method and apparatus for automatic type discrimination of differently sized disk-shaped information storage media, wherein pulses in a signal generated during the initial rotation and the associated elapsed time are counted and used to detect the size of the disk-shaped information storage medium. The method according to this invention comprises the steps of detecting signals produced from a driving unit for rotating a disk-shaped information storage medium; and identifying the type of the disk-shaped information storage medium according to the size thereof on the basis of comparison of the detected signal with a reference signal. This invention enables to detect the size of the disk-shaped information storage medium in a shorter period time compared to the conventional art because the initial time duration needed to get a desired stable rotation speed, which depends on the size of the disk-shaped information storage medium, is no longer required.

5 Claims, 6 Drawing Sheets

Conventional Art

*Conventional Art*

METHOD AND APPARATUS CAPABLE OF IDENTIFYING DIFFERENT TYPES OF DISK-SHAPED INFORMATION STORAGE MEDIA

BACKGROUND OF THE INVENTION

1. Field of the Invention

The present invention relates to automatic discrimination of a disk-shaped information storage medium, and more particularly to a method and apparatus capable of identifying different types of disk-shaped information storage media, each having a diameter different from each other.

2. Description of the Related Art

Referring to FIG. 1, a driving/detection apparatus in a conventional disk-shaped information storage medium reproduction apparatus comprises a pickup 11 for reading out information recorded in a disk-shaped information storage medium 10 by using a laser beam irradiated by an LED; a sled motor 12a for moving the pickup 11 in the radial direction of the disk-shaped information storage medium 10; a spindle motor 12b for rotating the disk-shaped information storage medium 10; a driving unit 30 for driving the sled motor 12a and the spindle motor 12b; an RF (radio-frequency) signal processing unit 20 for amplifying and filtering signals picked up by the pickup 11; a servo control unit 40 for servo-controlling the driving unit 30 on the basis of a focus error signal, tracking error signal, and the rotational speed of the disk-shaped information storage medium 10 and for detecting synchronization codes from the output of the RF signal processing unit 20; a digital signal processing unit (DSP) 50 for converting analog signals from the RF signal processing unit 20 received through servo control unit 40 into digital signals; a memory 70 for storing the time it takes for a GFS (Good Frame Sync.) signal from DSP 50 to be detected since the initial rotation of the disk-shaped information storage medium 10, so-called GFS detection time; a timer 80 for counting the time elapsed since the initial rotation; a MICOM (microcomputer) 60 for controlling the overall operations of the above-described components.

In the driving/detection apparatus configured as above, the conventional method for detecting the size of a disk-shaped information storage medium is as follows. Once a disk-shaped information storage medium is loaded, the driving/detection apparatus is initialized and then the disk-shaped information storage medium is rotated by the spindle motor 12b, which is driven by the servo control unit 40 and the driving unit 30 responsive to the MICOM 60. A voltage level applied to the spindle motor 12b is determined such that the initial over-rotation of the disk-shaped information storage medium does not occur. Specifically, a voltage level which is adequate to rotate the lightest disk-shaped information storage medium, or a disk having a diameter of 8 cm at a stable speed, is supplied to the sled motor 12b. Under control of the MICOM 60, data on the disk-shaped information storage medium 10 is read out while the pickup 11 travels along the tracks of the disk-shaped information storage medium, and at the same time, the timer 80 starts to count the present time.

The analog signal read out by the pickup 11 is filtered by the RF signal processing unit 20. And then, with reference to a synchronous signal detected by the servo control unit 40, digital data is obtained from the analog signal by the digital signal processing unit ("DSP") 50.

At that time, the digital, data is obtained in the unit of frame, which is made up of 588 bits, as shown in FIG. 2. Once the rotational speed of the disk-shaped information storage medium 10 becomes equal to a preset desired speed, synchronization codes of 24 bits are read out periodically. When eight (8) synchronization codes are consecutively readout, the digital signal processing unit 50 sends a GFS signal to the MICOM 60, which stop the timer's count operation of the current time.

On receiving the GFS signal, the MICOM 60 reads the time T elapsed before the reception of the GFS signal from the timer 80. In order to determine the size of the disk-shaped information storage medium, the elapsed time T is compared, in a predetermined tolerance range, to three reference times (Ta, Tb, Tc) which represent three GFS detection times respectively corresponding to three differently sized optical discs having diameters of 8 cm, 10 cm, and 12 cm, as shown in FIG. 3. The three reference GFS detection times are stored in the memory 70.

However, in order to identify the types of disk-shaped information storage media according to their sizes, the conventional method requires the time duration it takes for the rotational speed of a disk-shaped information storage medium to reach a constant linear velocity because GFS signals are obtainable only during stable rotation.

Moreover, a driving unit must be controlled carefully enough to drive the disk-shaped information storage medium stably, regardless of its diameter. Because it takes longer to achieve stable driving of disk-shaped information storage mediums having greater diameters, the GFS detection times of disk-shaped information storage media having diameters larger than 8 cm are much longer than that of disk-shaped information storage medium having a diameter of 8 cm or less.

SUMMARY OF THE INVENTION

The present invention is directed to a system and method that substantially obviates one or more of the problems experienced due to the above and other limitations and disadvantages of the related art.

It is an object of the present invention to provide a method and apparatus which enables identification of different types of disk-shaped information storage media, each having a diameter different from each other, in a shorter period of time.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes an apparatus for automatically identifying the types of disk-shaped information storage media according to their sizes, comprising means for detecting a signal produced from a driving means for rotating a disk-shaped information storage medium; a timer for counting the time elapsed since the signal from the driving means begins to be detected; means for comparing either the signal generated from the detecting means or the elapsed time produced from the timer with the corresponding reference signal or time duration; and means for identifying the type of the disk-shaped information storage medium according to the size thereof on the basis of the comparison result.

In a method for identifying the types of disk-shaped information storage media according to the present invention, once a disk-shaped information storage medium is loaded in a disk driver, the disk-shaped information storage medium is rotated by a predetermined driving force.

Signals are detected that are generated in proportion to the rotational amount, and at the same time, the time elapsed since the detection of the signals is counted. By using the detected signals and the elapsed time, the size of the disk-shaped information storage medium is detected and used to identify the type thereof.

According to the apparatus and method of the present invention, once a disk-shaped information storage medium is loaded in a disk driver, the information storage medium is rotated by a predetermined driving force. The signal detection means detects signal that is generated in proportion to the rotational amount, and at the same time, the timer counts the time elapsed since the signals begin to be detected. A comparison is made, in the determination means, as to whether the elapsed time corresponds to a reference time duration or the number of pulses in the detected signal is equal to a reference number of pulses. Based on the comparison result, the size of the disk-shaped information storage medium is detected, and thus the type thereof is identified.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operation, and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFERRED EMBODIMENT

Figure 1:
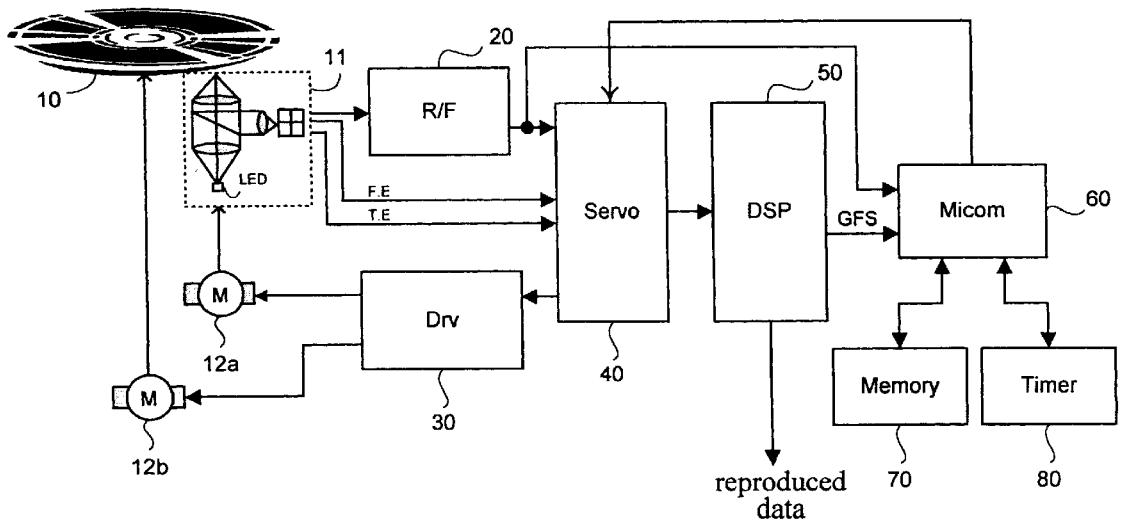
FIG. 1 is a schematic diagram showing a driving/detection apparatus in a conventional optical disk player.
Figure 2:
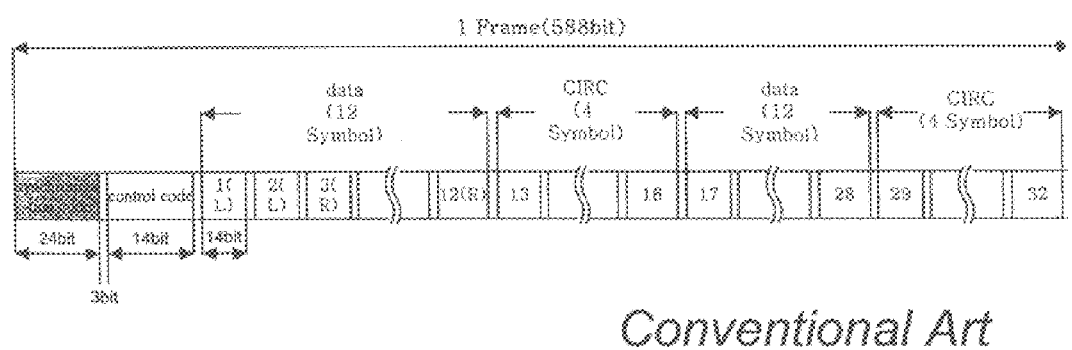
FIG. 2 is a schematic representation showing the contents of a frame read from a conventional optical disc.
Figure 3:
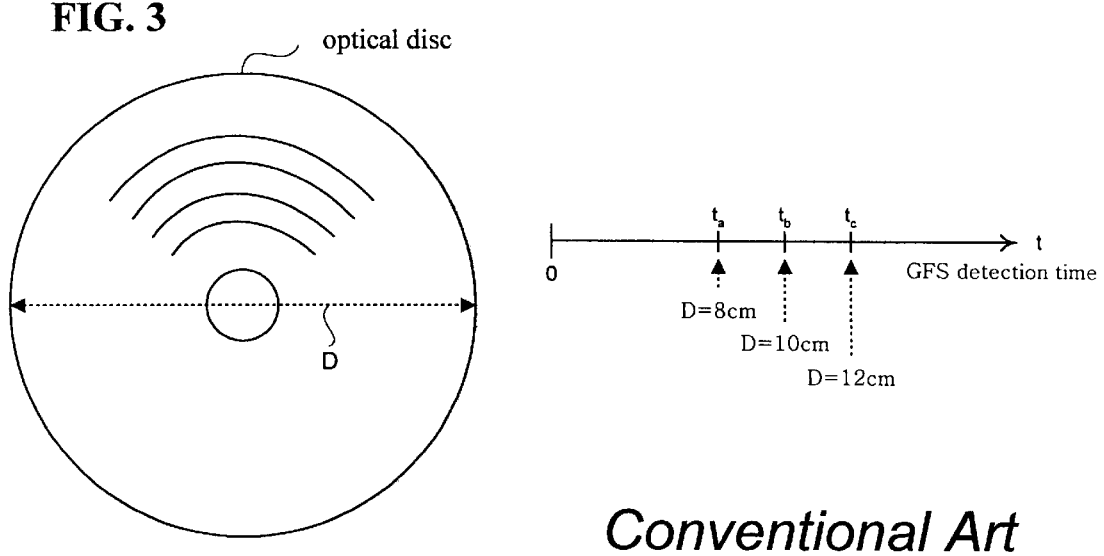
FIG. 3 is a schematic diagram illustrating three GFS detection times corresponding to three differently sized conventional optical discs.

The preferred embodiments of the present invention will be described below in detail referring to the accompanying drawings. In the drawings, like reference numerals represent like elements, steps and features.

Figure 4:
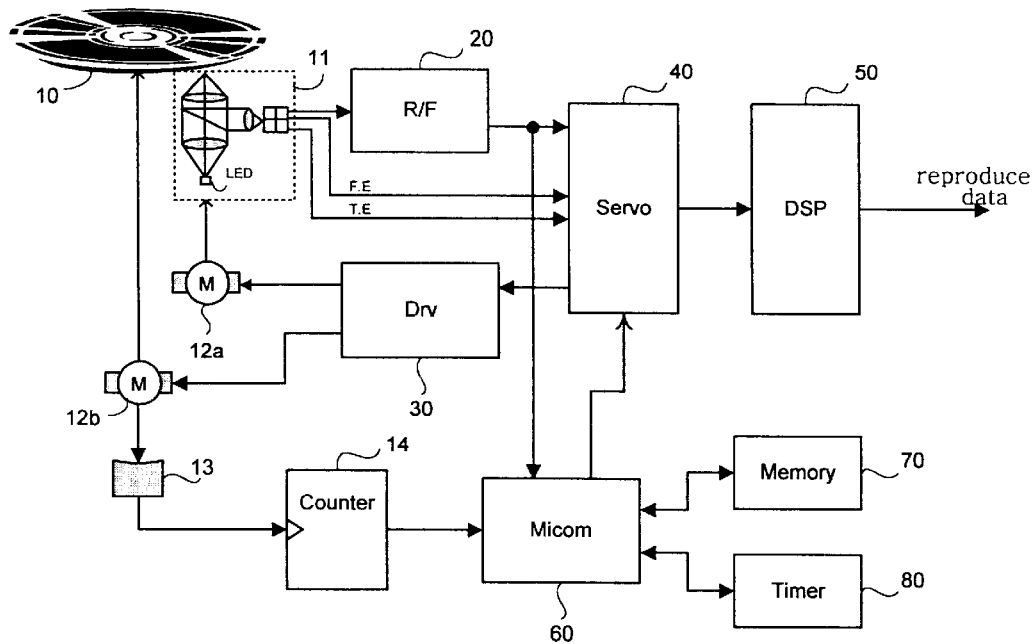
FIG. 4 is a schematic diagram showing an apparatus for identifying the types of optical discs according to a preferred embodiment of the present invention.

FIG. 4 shows an apparatus for identifying different types of optical discs according to the present invention. The apparatus of FIG. 4 includes many of the same components as the apparatus of FIG. 1, but is unique in that it also includes a Hall sensor 13 for sensing the number of rotations of the spindle motor 12b and a counter 14 for counting pulses in a signal produced from the Hall sensor 13. The number of output pulses of the Hall sensor 13 which are detected for a predetermined initial time duration is, moreover, stored in the memory 70. For example, if about 100 to 110 pulses are generally counted, in common driving units, for an optical disk having a diameter of 10 cm for initial three seconds, the range of fluctuation in the number of pulses (100 to 110) is stored in the memory 70 and is used as a criterion by which the sizes of optical discs are determined.

A method for identifying the types of optical discs according to the sizes thereof will be described now in detail with reference to a configuration of FIG. 4 and a flowchart of FIG. 5.

Figure 6:
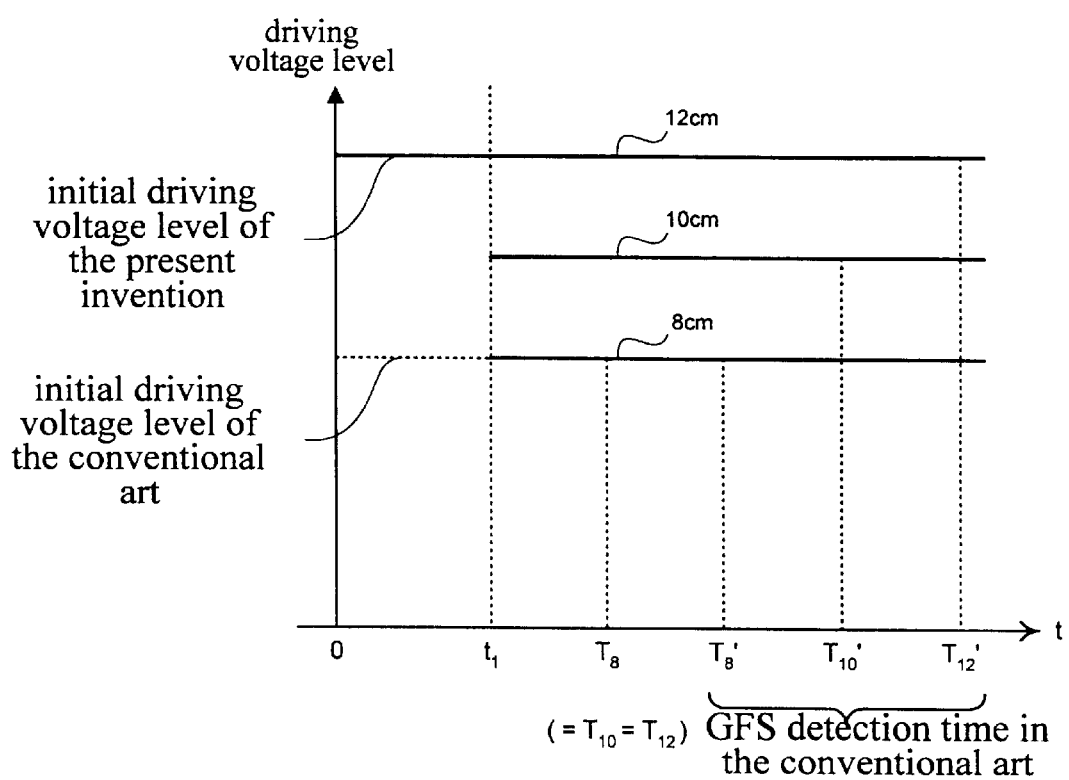
FIG. 6 is a plot illustrating a relationship between initial driving voltage levels and GFS detection times of the three differently sized discs.

Once an optical disk 10 is mounted in a disk driver and the driver is initialized (S10), the optical disk starts to be rotated by applying a maximum driving voltage (S11). As shown in FIG. 6, as an initial driving voltage level for rotating the optical disc, the MICOM 60 supplies a driving voltage to the sled motor 12b, which driving voltage is appropriate for driving an optical disk having a diameter of 12 cm. Because the voltage applied to sled motor 126 remains constant initially, the number of rotations of the optical disk per time depends on the size of the optical disk. A smaller disk will rotate more in a given time period than a larger disk.

Simultaneously, the timer 80 begins to count starting at the present time (S12). The MICOM 60 reads the output of the counter 14, which counts the number of rotations by the sled motor 12b, and hence the number of rotations by the optical disk, based on the number of pulses in a signal generated by the Hall sensor 13 (S13). The time elapsed, counted by the timer 80, is compared to a time duration T1, which is stored in the memory 70 (S20).

When it is determined that the elapsed time corresponds to the time duration t1, the MICOM 60 stops the count operation of the timer 80, and checks if the output of the counter 14, or the number of counted pulses, falls into the reference range of 100 to 110, which is stored in the memory 70 (S21). If the number of pulses falls into the reference range, the optical disk is identified as one having a diameter of 10 cm. If the number of pulses is larger than the reference range, the diameter of the disk is classified as 8 cm because the fact that a larger number of pulses are detected means that a smaller sized disk has been rotated. On the other hand, if the number of pulses is smaller than the reference range, the disk is classified as one having a diameter of 12 cm (S22).

Once the size of the optical disk is detected, an appropriate voltage level which is associated with the identified size thereof is determined and supplied to the sled motor 12b through the servo control unit 40 and the driving unit 30 (S23). As shown in FIG. 6, for the three differently sized discs, three optimum voltage levels are provided. Therefore, the GFS detection time for a disk having a diameter of 12 cm (10 cm, 8 cm) is reduced significantly by T12'–T12 (T10'–T10, T8'–T8), leading to quicker reproduction than in the conventional method.

Another method for identifying the types of optical discs according to the sizes thereof will be described now in detail with reference to a configuration of FIG. 4 and a flowchart of FIG. 7.

In this embodiment, the time it takes for an optical disk having a diameter of 10 cm to rotate by a predetermined number of rotations is stored in the memory 70, together with a tolerance range. Since an optical disk is mounted in a disk driver (S30), the steps of rotating the optical disk (S31), counting the current time by the timer 80 (S32), and counting the number of pulses (S33) are carried out, as in the method shown in FIG. 5. After that, the MICOM 60 checks whether or not the number of counted pulses is coincident with a reference number of pulses (S40).

Once it is determined that they match, the MICOM 60 stops the operation of the timer 80, and checks if the time elapsed since the initial driving, which has been counted by the timer 80, falls within a predetermined reference time interval, which is stored in the memory 70 (S41). If the elapsed time falls into the reference time interval, the optical disk is identified as one having a diameter of 10 cm. If the elapsed time is longer than the reference time interval, the diameter of the disk is classified as 12 cm because the fact that more time was needed to get the equal number of rotations means that a larger sized disk has been rotated. On the other hand, if the elapsed time is smaller, the disk is classified as one having a diameter of 8 cm (S42). The step of determining a rotational speed of the identified optical disk is carried out, as in the method shown in FIG. 5.

Figure 5:
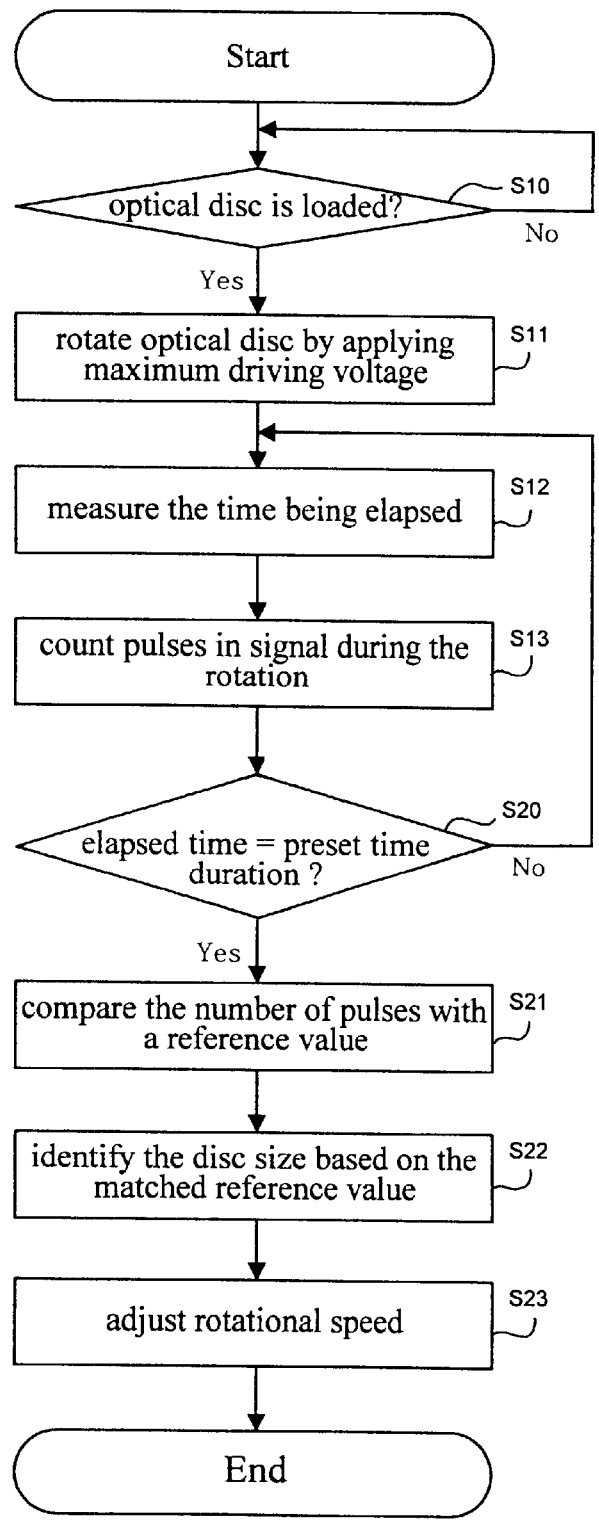
FIG. 5 is a flowchart showing a method for identifying the types of optical discs according to a preferred embodiment of the present invention.
Figure 7:
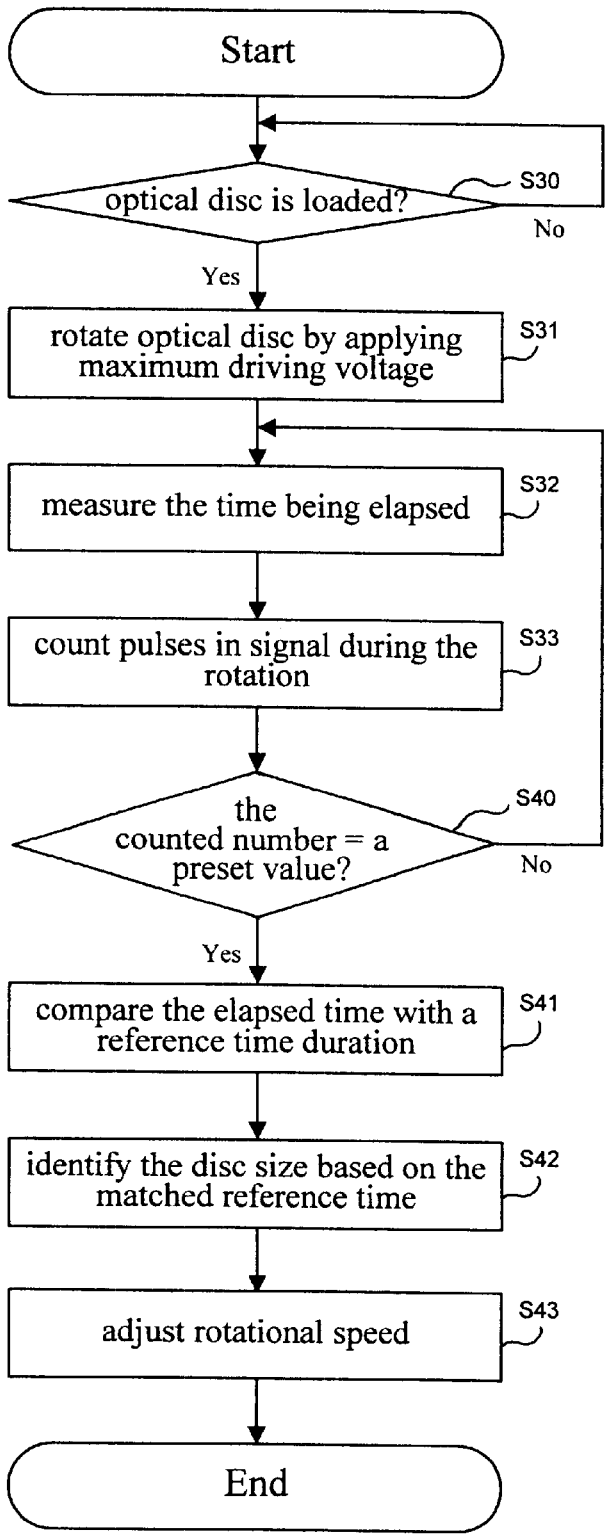
FIG. 7 is a flowchart showing another method for identifying the types of optical discs according to a preferred embodiment of the present invention.

Information on the size of an optical disk which is detected according to the methods shown in FIGS. 5 and 7 can be also utilized for quick stop operation of the disc's rotation.

The present invention makes it possible to detect the size of a disk-shaped information storage medium in a shorter period of time compared to the conventional arts. The time duration needed to get a desired stable rotational speed, which varies with the size of the disk-shaped information storage medium, is no longer required. As a result, the time required to start to read out information from disk-shaped information storage media is reduced, irrespective of the sizes thereof. Furthermore, the present invention is not dependant upon data stored on the optical disk, e.g., sync codes, for determining disk size.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method of identifying a diameter of a disk-shaped information storage medium, comprising:

powering a motor to start rotation of the disk-shaped information storage medium;

counting pulses outputted from a Hall sensor, which pulses indicate rotation of the disk-shaped information storage medium; when a predetermined period of time passes after said powering step, comparing the total counted pulses to a reference value; and identifying the diameter of the disc-shaped information storage medium based on the comparison between the total counted pulses and the reference value.

2. A method according to claim 1, further comprising the step of:

adjusting the power supplied to the motor to rotate the disk-shaped information storage medium on the basis of the identified diameter of the disk-shaped information storage medium.

3. A method according to claim 2, wherein a first power level is supplied to the motor when the diameter is identified as a first diameter, and wherein a second power level, greater than the first power level, is supplied to the motor when the diameter is identified as a second diameter, greater than the first diameter, and wherein said step of powering the motor to start rotation of the disk-shaped information storage medium entails supplying the second power level to the motor.

4. An apparatus capable of identifying a diameter of disk-shaped information storage mediums, comprising:

(a) a first counter structured and arranged to count a predetermined period of time, which starts upon initial rotation of the disk-shaped information storage medium;

(b) a second counter structured and arranged to count pulses outputted from a Hall sensor, which pulses indicate rotation of the disk-shaped information storage medium over the predetermined period of time; and (c) an identifier that identifies the diameter of the disk-shaped information storage medium by comparing the total counted pulses to a reference value.

5. An apparatus according to claim 4 further comprising:

a rotational speed adjusting mechanism structured and arranged to adjust the rotational speed of the disk-shaped information storage medium on the basis of the identified diameter thereof.

\* \* \* \* \*